(12) United States Patent
Luo

(10) Patent No.: US 12,447,780 B1
(45) Date of Patent: Oct. 21, 2025

(54) TOW HOOK DEVICE

(71) Applicant: Xiaoyao Luo, Bazhong (CN)

(72) Inventor: Xiaoyao Luo, Bazhong (CN)

( * ) Notice: Subject to any disclaimer, the term of this patent is extended or adjusted under 35 U.S.C. 154(b) by 76 days.

(21) Appl. No.: 18/785,569

(22) Filed: Jul. 26, 2024

(51) Int. Cl.
*B60D 1/06* (2006.01)
*B60D 1/07* (2006.01)
*B60D 1/46* (2006.01)

(52) U.S. Cl.
CPC .............. *B60D 1/06* (2013.01); *B60D 1/07* (2013.01); *B60D 1/46* (2013.01)

(58) Field of Classification Search
CPC ............... B60D 1/06; B60D 1/07; B60D 1/46
See application file for complete search history.

(56) References Cited

U.S. PATENT DOCUMENTS

| | | | | |
|---|---|---|---|---|
| 4,863,185 A | * | 9/1989 | Coppe .................... | B60D 1/06 280/491.2 |
| 5,280,941 A | * | 1/1994 | Guhlin .................... | B60D 1/60 411/910 |
| 11,325,434 B2 | * | 5/2022 | Pennington .............. | B60D 1/46 |
| 11,660,916 B2 | * | 5/2023 | Singh .................... | B60D 1/065 280/490.1 |
| 2003/0052472 A1 | * | 3/2003 | Moss ...................... | B60D 1/54 280/491.1 |

* cited by examiner

*Primary Examiner* — Valentin Neacsu
*Assistant Examiner* — Marlon A Arce
(74) *Attorney, Agent, or Firm* — WPAT, PC

(57) ABSTRACT

A tow hook device includes a tow ball body, a tow ball hitch and a tow arm. The tow ball body includes at least one tow ball and a tow ball rod, the tow ball rod is disposed on the at least one tow ball and provided with external threads, the tow ball hitch defines a threaded hole provided with internal threads, and the tow ball rod has a threaded connection with the tow ball hitch through the threaded hole. The tow hook device has a reasonable structure, great practicality, convenient use, stability, reliability, flexible installment and disassembly, and improved work efficiency.

2 Claims, 5 Drawing Sheets

TOW HOOK DEVICE

TECHNICAL FIELD

The disclosure relates to the technology field of towable recreational vehicle (RV) connecting devices, and more particularly to a tow hook device.

BACKGROUND

A towable RV has no independent drive system, and need to be connected to a towing vehicle via a connecting device for driving force provided by the towing vehicle.

A structure of the connecting device directly affects stability of a connection between the towable RV and the towing vehicle. Current trailer hooks of the connecting device are generally fixed on a rear bar of the towing vehicle, and bearing capacity of the trailer hook is concentrated at a point of the rear bar of the towing vehicle, leading to low stability of the connecting device.

In the related art, some tow hook devices include a tow ball body and a tow arm, the tow ball body includes a tow ball and a tow ball hitch, and the connection between the tow ball hitch and the tow arm is not tight. There may be a certain gap between the tow ball hitch and the tow arm body through shaking, which affects the safety of use. Installation and disassembly of the tow hook device in the related art is not flexible enough, and it is inconvenient to use the tow hook device, resulting in a long time of the installation and the disassembly and low work efficiency.

SUMMARY

A main purpose of the disclosure is to provide a tow hook device with a reasonable structure, great practicality, convenient use, reliability, flexible installment and disassembly, and improved work efficiency.

In order to achieve the above purpose, the disclosure provides the tow hook device. The tow hook device includes a tow ball body, a tow ball hitch and a tow arm. The tow ball body includes at least one tow ball and a tow ball rod, the tow ball rod is disposed on the at least one tow ball and provided with external threads, the tow ball hitch defines a threaded hole provided with internal threads, and the tow ball rod has a threaded connection with the tow ball hitch through the threaded hole.

In an embodiment, the at least one tow ball includes a first tow ball and a second tow ball, the first tow ball is disposed on an end of the tow ball rod, and the second tow ball is disposed on another end of the tow ball rod.

In an embodiment, the tow ball body further includes a spring detent ring, a connection position of the tow ball rod with the second tow ball is provided with a shaft groove, and the spring detent ring is disposed on the shaft groove.

In an embodiment, the tow ball hitch includes a clamping jaw disposed at a front end of the tow ball hitch, and the tow ball hitch is connected to the tow arm by the clamping jaw.

In an embodiment, two sides of an inner wall of the clamping jaw are respectively provided with a first convex edge and a second convex edge, the tow arm includes a square steel, two sides of the tow arm respectively define a first vertical groove and a second vertical groove, the first convex edge is snap-fitted with the first vertical groove, and the second convex edge is snap-fitted with the second vertical groove.

In an embodiment, a shape and size of the first convex edge corresponds to a shape and size of the first vertical groove, and a shape and size of the second convex edge corresponds to a shape and size of the second vertical groove.

In an embodiment, the tow ball hitch is provided with a first receiver latch lock, a side wall of the clamping jaw defines a round hole, the tow arm defines at least one tow arm hole vertically, and the first receiver latch lock is connected to the tow arm through the round hole and the at least one tow arm hole.

In an embodiment, the square steel defines at least one square steel hole, the square steel is provided with a second receiver latch lock, and the second receiver latch lock is connected to the square steel by the at least one square steel hole.

The disclosure has the following benefits.

The tow hook device includes the tow ball body and the tow ball hitch. The tow ball body includes the at least one tow ball and the tow ball rod. The tow ball rod is disposed on the at least one tow ball and provided with the external threads. The tow ball hitch defines the threaded hole provided with the internal threads, and the tow ball rod has the threaded connection with the tow ball hitch through the threaded hole.

The tow ball hitch is more tightly connected to the tow ball body through above structures, greatly improving stability, safety and reliability during use.

The disclosure has great practicality, convenient use, the reasonable structure and improved work efficiency, suitable for widespread promotion and use.

BRIEF DESCRIPTION OF DRAWINGS

In order to more clearly illustrate technical solutions in embodiments of the disclosure or related art, and accompanying drawings in the embodiments or the related art are briefly introduced below. It is apparent that the accompanying drawings in the following description are only some of the embodiments of the disclosure, and that other drawings can be obtained according to structures illustrated in the accompanying drawings by those skilled in the art without creative labor.

Figure 1:
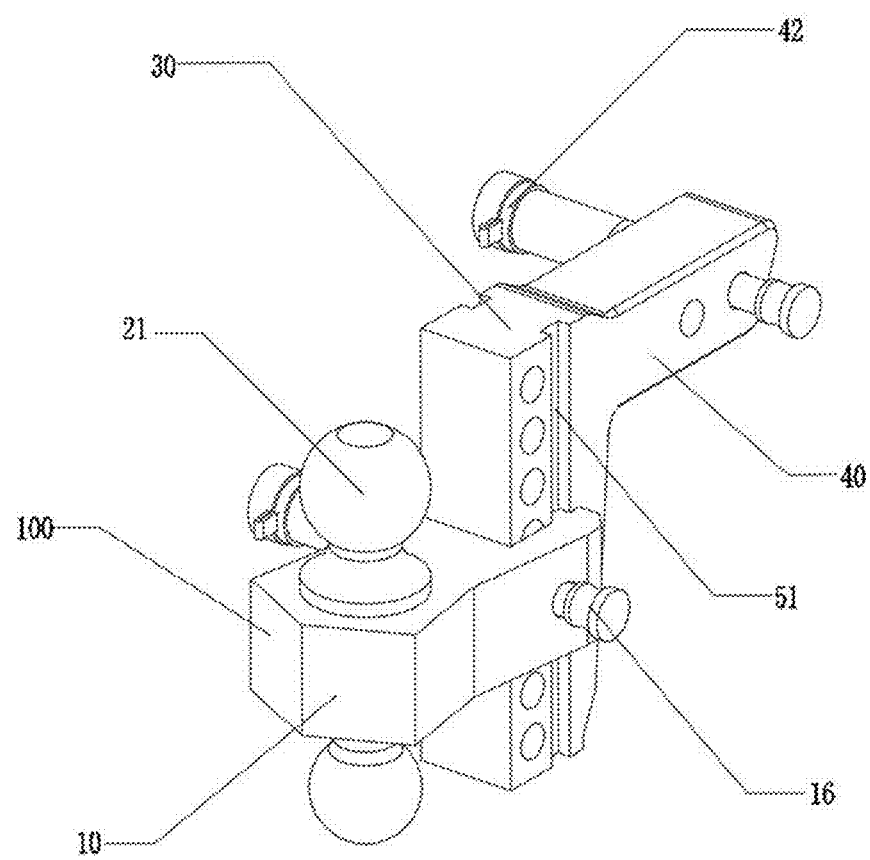
FIG. 1 illustrates a schematic structural diagram of a tow hook device according to an embodiment of the disclosure.
Figure 2:
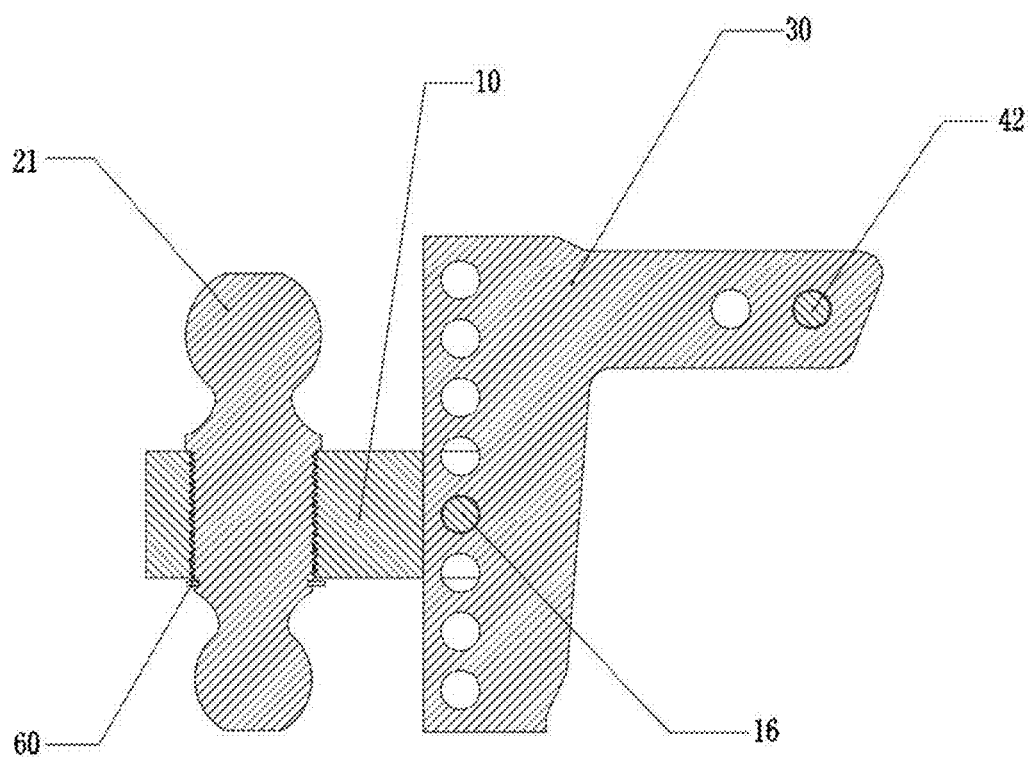
FIG. 2 illustrates a sectional view of the tow hook device according to the embodiment of the disclosure.

The implementation, functional characteristics, and advantages of the disclosure are further explained with reference to the accompanying drawings in conjunction with the embodiments.

DETAILED DESCRIPTION OF EMBODIMENTS

Technical solutions in embodiments of the disclosure will be clearly and completely described below in conjunction with the accompanying drawings in the embodiments of the disclosure, and it is apparent that the described embodiments are only a part of the embodiments of the disclosure, and not all of the embodiments. Based on the embodiments in the disclosure, all other embodiments obtained by those skilled in the art without creative labor fall within the scope of protection of the disclosure.

It should be noted that all direction indications (such as up, down, left, right, forth and back) in the embodiments of the disclosure are only used to explain relative positional relationship, movement, etc., among various components in a particular attitude (as shown in the accompanying drawings), and that the direction indications are correspondingly changed in an event of a change in that particular attitude.

In the disclosure, unless otherwise expressly specified and limited, terms, such as "connected" and "fixed", etc. should be understood in a broad sense, e.g., "fixed" can be a fixed connection, a removable connection or a one-piece connection; it can be a mechanical connection or an electrical connection; it can be a direct connection or an indirect connection through an intermediate medium; it can be a connection within two elements or an interaction between two elements. Unless expressly limited otherwise, for those skilled in the art, specific meanings of above terms in the disclosure may be understood on a case-by-case basis.

In addition, if there are descriptions related to "first" and "second" etc. in the embodiments of the disclosure, such descriptions are only for descriptive purposes and cannot be understood as indicating or implying their relative importance or implying the number of indicated technical features. Therefore, features defined with "first" and "second" can explicitly or implicitly include at least one of these features. In addition, the meaning of "and/or" appearing throughout the disclosure includes three parallel schemes. Taking "A and/or B" as an example, it includes a scheme A, or a scheme B, or a scheme that both A and B satisfy.

Furthermore, the technical solutions of various embodiments can be combined with each other, but must be based on that those skilled in the art can achieve. When the combination of the technical solutions conflicts with each other or cannot be achieved, it should be considered that the combination of the technical solutions does not exist and is not within the scope of protection claimed by the disclosure.

The disclosure provides a tow hook device.

Embodiment 1

Referring to FIG. 1 to FIG. 5, in an embodiment of the disclosure, the tow hook device includes a tow ball body 100, a tow ball hitch 10 and a tow arm 30. The tow ball body 100 includes a first tow ball 21 and a tow ball rod 23. The tow ball rod 23 is disposed on the first tow ball 21 and provided with external threads 24.

The tow ball hitch 10 defines a threaded hole 11 provided with internal threads 111, and the tow ball rod 23 has a threaded connection with the tow ball hitch 10 through the threaded hole 11.

In the embodiment, the tow ball body 100 further includes a second tow ball 22. The first tow ball 21 is disposed on an end of the tow ball rod 23, and the second tow ball 22 is disposed on another end of the tow ball rod 23.

In the embodiment, the tow ball body 100 includes two tow balls, i.e., the first tow ball 21 and the second tow ball 22. The first tow ball 21 and the second tow ball 22 can be disposed up and down along the tow ball rod 23. Of course, according to actual needs, the tow ball body 100 can be provided with multiple tow balls configured to connect the towing device of a RV.

Figure 3:
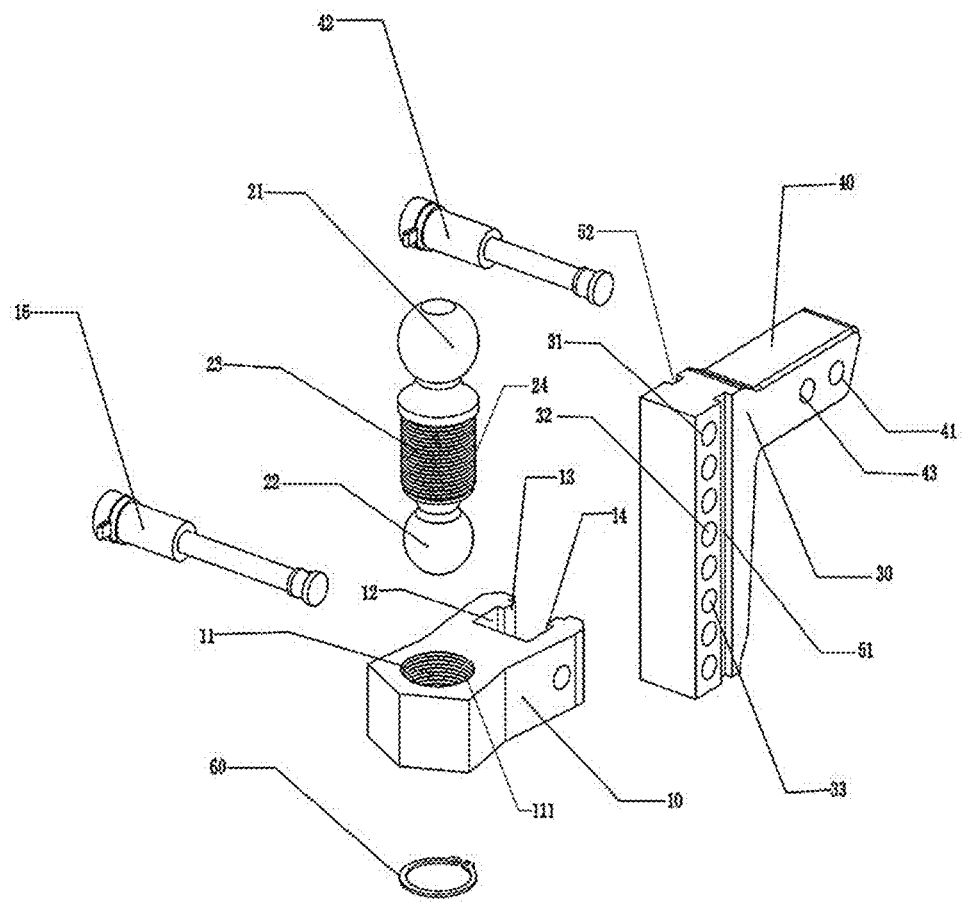
FIG. 3 illustrates a schematic exploded view of the tow hook device according to the embodiment of the disclosure.

Referring to FIG. 3, in the embodiment, preferably, the tow ball hitch 10 defines a threaded hole 11, and a size of the threaded hole 11 corresponds to a diameter of the tow ball rod 23. The tow ball rod 23 is connected to the tow ball hitch 10 through the internal threads 111 of the threaded hole 11 and the external threads 24 of the tow ball rod 23. Furthermore, the tow ball rod 23 is detachably connected to the first tow ball 21 and the second tow ball 22 separately.

In the embodiment, the threaded hole 11 is defined on a surface of the tow ball hitch 10, and the tow ball body 100 passes through the threaded hole 11. The first tow ball 21 and the second tow ball 22 are disposed at upper and lower sides of the tow ball hitch 10.

If the tow ball body 100 is to be removed from the tow ball hitch 10, the second tow ball 22 is first removed from the tow ball rod 23 and then the tow ball rod 23 is unscrewed from the threaded hole 11, so as to separate the tow ball body 100 from the tow ball hitch 10. The tow ball body 100 can be simply removed from the tow ball hitch 10, making it more convenient for use and more flexible to assemble and disassemble.

Furthermore, preferably, a size of the first tow ball 21 differs from a size of the second tow ball 22, and a diameter of the second tow ball 22 is less than a diameter of the threaded hole 11. If the tow ball body 100 is to be removed from the tow ball hitch 10, there is no need to remove the second tow ball 22 from the tow ball rod 23, and the tow ball rod 23 can be directly unscrewed from the threaded hole 11, so as to separate the tow ball body 100 from the tow ball hitch 10, making it more convenient for use and more flexible to assemble and disassemble.

Figure 4:
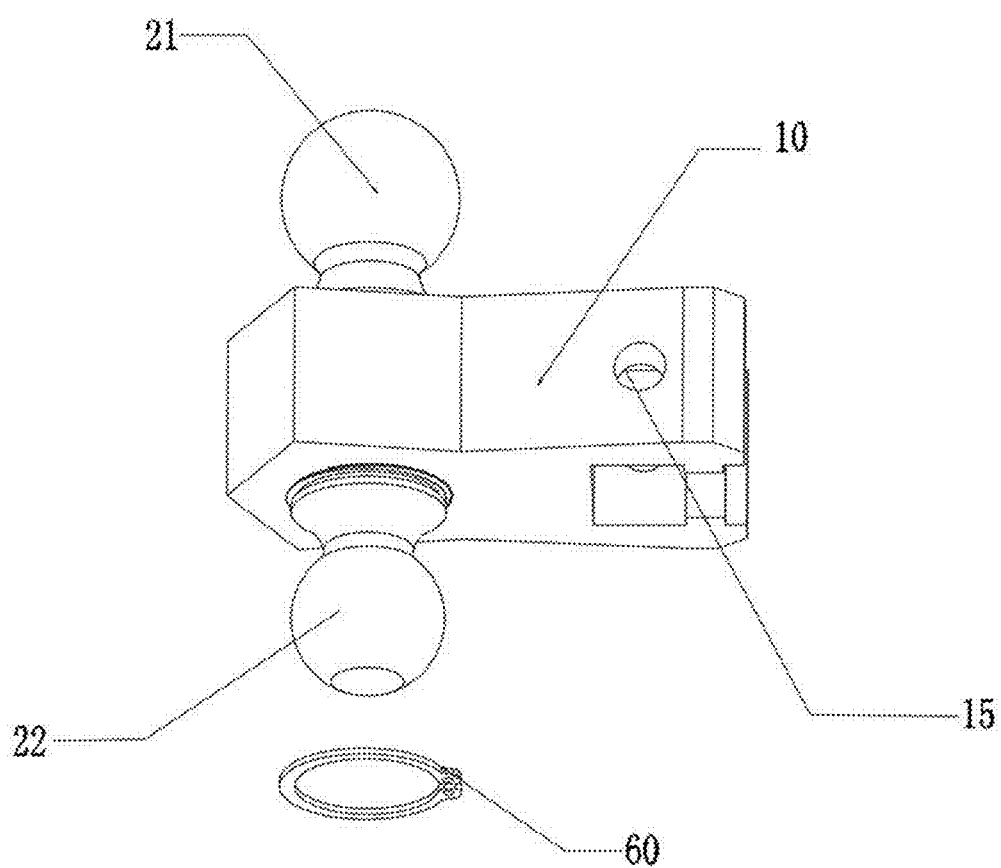
FIG. 4 illustrates a schematic exploded view of a tow ball hitch of the tow hook device according to the embodiment of the disclosure.
Figure 5:
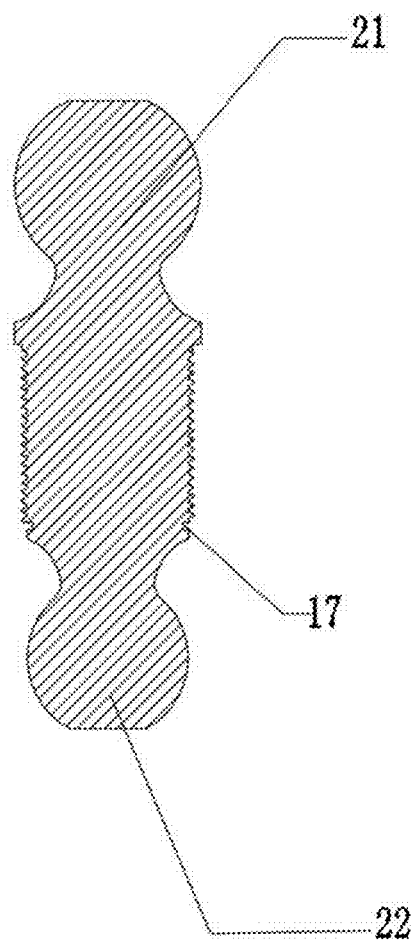
FIG. 5 illustrates a sectional view of a tow ball body of the tow hook device according to the embodiment of the disclosure.

Referring to FIG. 3 to FIG. 5, in the embodiment, the tow ball body 100 includes a spring detent ring 60, a connection position of the tow ball rod 23 with the second tow ball 22 is provided with a shaft groove 17, and the spring detent ring 60 is disposed on the shaft groove 17.

The spring detent ring 60 mainly serves to fasten the second tow ball 22 and the tow ball hitch 10, making it difficult for the second tow ball 22 which is assembled to fall off from the tow ball hitch 10, thereby making it more stable and reliable for use.

Furthermore, preferably, since the diameter of the first tow ball 21 is larger than the diameter of the second tow ball 22, the diameter of the first tow ball 21 is larger than the diameter of the threaded hole 11 and the diameter of the second tow ball 22 is less than the diameter of the threaded hole 11; when the spring detent ring 60 is removed from the connection position of the tow ball rod 23 with the second tow ball 22, the tow ball rod 23 can be directly unscrewed from the threaded hole 11, so as to separate the tow ball body 100 from the tow ball hitch 10, making it easier and more convenient to disassemble and improving work efficiency.

Embodiment 2

Referring to FIG. 3 to FIG. 5, in the embodiment, the tow ball hitch 10 includes a clamping jaw 12 disposed at a front end of the tow ball hitch 10, and the tow ball hitch 10 is connected to the tow arm 30 by the clamping jaw 12.

In the embodiment, the tow ball hitch 10 is fixedly connected to the tow arm 30 by the clamping jaw 12, making it more stable and safer for use.

In the embodiment, furthermore, two sides of an inner wall of the clamping jaw 12 are respectively provided with a first convex edge 13 and a second convex edge 14, the tow arm 30 includes a square steel 40, two sides of the tow arm 30 respectively define a first vertical groove 52 and a second vertical groove 51, the first convex edge 13 is snap-fitted with the first vertical groove 52, and the second convex edge 14 is snap-fitted with the second vertical groove 51.

In the embodiment, furthermore, preferably, a shape and size of the first convex edge 13 corresponds to a shape and size of the first vertical groove 52, and a shape and size of the second convex edge 14 corresponds to a shape and size of the second vertical groove 51.

In the embodiment, the tow arm 30 defines the first vertical groove 52 and the second vertical groove 51 at two sides of the tow arm 30, and a position of the first vertical groove 52 corresponds to a position of the second vertical groove 51. The shapes of the first convex edge 13 and the second convex edge 14 are vertical convex edges, with lengths corresponding to the first vertical groove 52 and the second vertical groove 51, respectively.

When in use, the tow ball hitch 10 is snap-fitted with the tow arm 30 through the clamping jaw 12, the first convex edge 13 is snap-fitted with the first vertical groove 52, and the second convex edge 14 is snap-fitted with the second vertical groove 51, making the connection between the tow ball hitch 10 and the tow arm 30 more tight and stable, thereby making it safer and more reliable for use.

In the embodiment, preferably, the tow ball hitch 10 includes a first receiver latch lock 16. A side wall of the clamping jaw 12 defines a round hole 15. The tow arm 30 defines at least one tow arm hole 31 vertically. The first receiver latch lock 16 passes through the round hole 15 and one of the at least one tow arm hole 31 to connect the tow arm 30.

In the embodiment, the tow arm 30 may define vertically multiple tow arm holes such as a first tow arm hole 31, a second tow arm hole 32 and a third tow arm hole 33. When in use, the first receiver latch lock 16 passes through the round hole 15 and may be connected to the first tow arm hole 31, a second tow arm hole 32 or a third tow arm hole 33, so as to connect the tow ball hitch 10 with the tow arm 30.

The tow arm 30 may define vertically multiple tow arm holes, mainly to adjust a height position of tow ball hitch 10, making it easier for the tow balls to adapt to other vehicles of different heights that need to be towed.

In the embodiment, the first receiver latch lock 16 is configured to connect the tow ball hitch 10, the tow ball body 100 and the tow arm 30, and restrict positions of the tow ball hitch 10 and the tow ball body 100 in up and down, front and rear directions, providing a fixing effect, making it safer and more reliable to use.

In the embodiment, the clamping jaw 12 is tightly connected to the tow arm 30 by the first receiver latch lock 16, making the tow ball hitch 10 tightly connected to the tow arm 30, thereby making it more stable and safer for use. Moreover, when towing, the force applied is less likely to cause the tow ball hitch 10 to detach from the tow arm 30, making it more reliable and safer to use.

In the embodiment, the tow arm 30 is configured to connect, fix and adjust a distance from the tow ball hitch 10 to ground, making it easier for the tow balls to adapt to other vehicles of different heights that need to be towed. At the same time, a left-right translation position of the tow ball hitch 10 is limited, a latch is inserted to the round hole 15 at the side wall to limit the up-down and front-back translation position of the tow ball hitch 10.

In the embodiment, the tow arm 30 includes a square steel 40, and a side wall of the square steel 40 may define a first square steel hole 41 and a second square steel hole 43. The square steel 40 is provided with a second receiver latch lock 42 configured to connect to a receiver of the RV.

The second receiver latch lock 42 may be inserted and connected to the first square steel hole 41 or the second square steel hole 43. The second receiver latch lock 42 is configured to connect and lock the tow arm 30 and a vehicle receiver, and has an anti-theft function.

The disclosure has a reasonable structure, great practicality, flexible installment and disassembly, convenient use, and improved work efficiency.

Above are only optional embodiments of the disclosure, and is not intended to limit the scope of the patent of the disclosure, and any equivalent structural transformations made by utilizing contents of the specification and the accompanying drawings of the disclosure or directly/indirectly applied in other related art, under the invention concept, is included in the scope of the patent protection of the disclosure.

What is claimed is:

1. A tow hook device, comprising: a tow ball body, a tow ball hitch and a tow arm; wherein the tow ball body comprises at least one tow ball and a tow ball rod, the tow ball rod is disposed on the at least one tow ball and provided with external threads, the tow ball hitch defines a threaded hole provided with internal threads, and the tow ball rod has a threaded connection with the tow ball hitch through the threaded hole;

wherein the tow arm comprises a square steel, the square steel defines at least one square steel hole, the square steel is provided with a first receiver latch lock, and the first receiver latch lock is connected to the square steel by the at least one square steel hole;

wherein the at least one tow ball comprises a first tow ball and a second tow ball, the first tow ball is disposed on an end of the tow ball rod, and the second tow ball is disposed on another end of the tow ball rod;

wherein the tow ball body further comprises a spring detent ring, a connection position of the tow ball rod with the second tow ball is provided with a shaft groove, and the spring detent ring is disposed on the shaft groove;

wherein the tow ball hitch comprises a clamping jaw disposed at a front end of the tow ball hitch, and the tow ball hitch is connected to the tow arm by the clamping jaw;

wherein two sides of an inner wall of the clamping jaw are respectively provided with a first convex edge and a second convex edge, two sides of the tow arm respectively define a first vertical groove and a second vertical groove, the first convex edge is snap-fitted with the first vertical groove, and the second convex edge is snap-fitted with the second vertical groove;

wherein a shape and size of the first convex edge corresponds to a shape and size of the first vertical groove, and a shape and size of the second convex edge corresponds to a shape and size of the second vertical groove; and wherein the tow ball hitch is provided with a second receiver latch lock, a side wall of the clamping jaw defines a round hole, the tow arm defines at least one tow arm hole vertically, and the second receiver latch lock is connected to the tow arm through the round hole and the at least one tow arm hole.

2. A tow hook device, comprising: a tow ball body, a tow ball hitch and a tow arm;

wherein the tow ball body comprises at least one tow ball and a tow ball rod, the tow ball rod is disposed on the at least one tow ball and provided with external threads, the tow ball hitch defines a threaded hole provided with internal threads, and the tow ball rod has a threaded connection with the tow ball hitch through the threaded hole;

wherein the tow ball hitch comprises a clamping jaw disposed at a front end of the tow ball hitch, and the tow ball hitch is connected to the tow arm by the clamping jaw;

wherein two sides of an inner wall of the clamping jaw are respectively provided with a first convex edge and a second convex edge, the tow arm comprises a square steel, two sides of the tow arm respectively define a first vertical groove and a second vertical groove, the first convex edge is snap-fitted with the first vertical groove, and the second convex edge is snap-fitted with the second vertical groove;

wherein the tow ball hitch is provided with a first receiver latch lock, a side wall of the clamping jaw defines a round hole, the tow arm defines at least one tow arm hole vertically, and the first receiver latch lock is connected to the tow arm through the round hole and the at least one tow arm hole; and wherein the square steel defines at least one square steel hole, the square steel is provided with a second receiver latch lock, and the second receiver latch lock is connected to the square steel by the at least one square steel hole.

\* \* \* \* \*